United States Patent
Gross et al.

(10) Patent No.: US 10,540,612 B2
(45) Date of Patent: Jan. 21, 2020

(54) TECHNIQUE FOR VALIDATING A PROGNOSTIC-SURVEILLANCE MECHANISM IN AN ENTERPRISE COMPUTER SYSTEM

(71) Applicant: Oracle International Corporation, Redwood Shores, CA (US)

(72) Inventors: Kenny C. Gross, Escondido, CA (US); Kalyanaraman Vaidyanathan, San Diego, CA (US); Guang-Tong Zhou, Port Coquitlam (CA)

(73) Assignee: Oracle International Corporation, Redwood Shores, CA (US)

( * ) Notice: Subject to any disclaimer, the term of this patent is extended or adjusted under 35 U.S.C. 154(b) by 55 days.

(21) Appl. No.: 15/248,807

(22) Filed: Aug. 26, 2016

(65) Prior Publication Data

US 2018/0060151 A1    Mar. 1, 2018

(51) Int. Cl.
| | |
|---|---|
| *G06F 11/00* | (2006.01) |
| *G06N 20/00* | (2019.01) |
| *G06F 11/34* | (2006.01) |
| *G06F 21/55* | (2013.01) |

(Continued)

(52) U.S. Cl.
CPC ............ *G06N 20/00* (2019.01); *G06F 11/34* (2013.01); *G06F 11/3452* (2013.01); *G06F 21/552* (2013.01); *G06F 11/3058* (2013.01); *G06F 11/3409* (2013.01); *G06F 2221/034* (2013.01); *G06N 20/10* (2019.01)

(58) Field of Classification Search
CPC ............... G06F 11/079; G06F 11/0709; G06F 11/0751; G06F 11/0772
See application file for complete search history.

(56) References Cited

U.S. PATENT DOCUMENTS

| | | | | |
|---|---|---|---|---|
| 3,702,011 | A * | 10/1972 | Armstrong | ............ G06F 11/261 |
| | | | | 324/500 |
| 2003/0140268 | A1 * | 7/2003 | Mahoney | .................. H04L 1/06 |
| | | | | 714/47.1 |

OTHER PUBLICATIONS

Gross et al., Spectral Decomposition and Reconstruction of Telemetry Signals from Enterprise Computing Systems, Jan. 2005, DBLP, 7 pages.*

(Continued)

*Primary Examiner* — Katherine Lin
(74) *Attorney, Agent, or Firm* — Park, Vaughan, Fleming & Dowler LLP

(57) ABSTRACT

The disclosed embodiments relate to a system for validating a prognostic-surveillance mechanism, which detects anomalies that arise during operation of a computer system. During operation, the system obtains telemetry data comprising a set of raw signals gathered from sensors in the computer system during operation of the computer system, wherein the telemetry signals are gathered over a monitored time period. Next, for each raw signal in the set of raw signals, the system decomposes the raw signal into deterministic and stochastic components. The system then generates a corresponding set of synthesized signals based on the deterministic and stochastic components of the raw signals, wherein the synthesized signals are generated for a simulated time period, which is longer than the monitored time period. Finally, the system uses the set of synthesized signals to validate one or more performance metrics of the prognostic-surveillance mechanism.

20 Claims, 6 Drawing Sheets

(51) Int. Cl.
*G06N 20/10* (2019.01)
*G06F 11/30* (2006.01)

(56) References Cited

OTHER PUBLICATIONS

Whisnant et al; "Proactive Fault Monitoring in Enterprise Servers", presented at the International Conference on Computer Design (CDES'05), Jun. 27-30, 2005, Las Vegas, NV.
Humenik et al; "Sequential Probability Ratio Tests for Reactor Signal Validation and Sensor Surveillance Applications", Nuclear Science and Engineering: 105, 383-390 (1990).

* cited by examiner

TECHNIQUE FOR VALIDATING A PROGNOSTIC-SURVEILLANCE MECHANISM IN AN ENTERPRISE COMPUTER SYSTEM

BACKGROUND

Field

The disclosed embodiments generally relate to prognostic-surveillance techniques for enterprise computer systems. More specifically, the disclosed embodiments relate to a technique for validating the performance of a prognostic-surveillance mechanism, which is used to detect operational anomalies that arise during operation of an enterprise computer system.

Related Art

Enterprise computing systems often monitor telemetry data obtained from internal physical sensors and software resources to diagnose operational issues that might arise and, if necessary, issue warnings of impending problems. However, commonly used threshold-based warnings and diagnostics are "reactive" in nature; by the time a threshold limit has been exceeded, the problem is already severely affecting system performance (or the system has crashed). Because of the business-critical nature of enterprise and cloud computing systems, this endemic limitation of threshold-based diagnostics has motivated the development of prognostic-surveillance mechanisms that use "predictive-analytic" techniques, such as techniques based on the sequential probability ratio test (SPRT), to proactively alert system operators of incipient anomalies, such as impending failures or malicious intrusion events, hopefully with enough lead time so that such problems can be avoided or proactively fixed.

Such predictive-analytic techniques have proven quite effective in detecting incipient anomalies in enterprise computing systems. However, as these predictive-analytic techniques are applied to detect different types of anomalies, such as anomalies related to cybersecurity applications, the desired False-Alarm Probabilities (FAPs) have become significantly smaller than for previous electronic-prognostics applications. The reason that ultra-low FAPs are desirable for prognostic cybersecurity applications is that it is not feasible to continually shut down customer systems due to spurious trips of security alarms that turn out to be false alarms.

A big advantage of predictive-analytic techniques (as compared to conventional techniques based on threshold-limit tests) is that they can achieve high sensitivity for catching subtle anomalies and with extremely low FAPs. However, the length of time required to validate that these techniques are meeting the desired low FAPs is becoming problematic. For example, if we desire to achieve a FAP on the order of 1 in $10^5$ over 10,000 hours of operation with a sampling rate of one sample per hour, a good statistical rule of thumb is that we need at least five times as many hours of data to provide confidence that the specified FAP is being met. This means it will require about 50,000 hours (~5.7 years!) of telemetry data from a real computer system to validate this FAP, which is clearly impractical.

Hence, what is needed is a method and an apparatus that facilitates validating the performance of a prognostic-surveillance mechanism for an enterprise computer system without the above-described drawbacks of existing validation techniques.

SUMMARY

The disclosed embodiments relate to a system for validating a prognostic-surveillance mechanism, which detects anomalies that arise during operation of a computer system. During operation, the system obtains telemetry data comprising a set of raw signals gathered from sensors in the computer system during operation of the computer system, wherein the telemetry signals are gathered over a monitored time period. Next, for each raw signal in the set of raw signals, the system decomposes the raw signal into deterministic and stochastic components. The system then generates a corresponding set of synthesized signals based on the deterministic and stochastic components of the raw signals, wherein the synthesized signals are generated for a simulated time period, which is longer than the monitored time period. Finally, the system uses the set of synthesized signals to validate one or more performance metrics of the prognostic-surveillance mechanism.

In some embodiments, validating the one or more performance metrics of the prognostic-surveillance mechanism comprises validating that the prognostic-surveillance mechanism meets a desired false alarm probability (FAP) and/or a desired missed alarm probability (MAP).

In some embodiments, each synthesized signal in the set of synthesized signals has the same serial-correlation structure and the same stochastic structure as a corresponding raw signal in the set of raw signals.

In some embodiments, decomposing the raw signal comprises using an iterative Fourier decomposition technique to decompose the raw signal into deterministic components that comprise an envelope of superimposed sine waves and cosine waves.

In some embodiments, decomposing the raw signal further comprises subtracting the deterministic components from the raw signal to generate a residual signal that comprises the stochastic components of the raw signal, wherein the stochastic components define a stationary stochastic process.

In some embodiments, generating the synthesized signal based on the deterministic and stochastic components comprises: (1) generating a deterministic signal based on the deterministic components; (2) generating a stochastic signal by simulating a stationary stochastic process defined by the stochastic components; and then (3) superimposing the stochastic signal over the deterministic signal to produce the synthesized signal.

In some embodiments, a stationary stochastic process that defines the stochastic components comprises one or more of the following: a Gaussian process; a Poisson process; and a uniform random process.

In some embodiments, a stationary stochastic process that defines the stochastic components generates a probability distribution defined by one or more of the following parameters: a mean; a variance; a skewness; and a kurtosis.

In some embodiments, the prognostic-surveillance mechanism uses one or more models that are trained using a nonlinear, nonparametric (NLNP) regression technique to predict signal values.

In some embodiments, the set of raw signals includes signals gathered from physical sensors in the computer system that monitor physical performance parameters, including one or more of temperature, voltage, current, vibration, and acoustic parameters. The set of raw signals also includes signals that carry software-related telemetry parameters, including one or more of processor load, memory usage, cache usage, system throughput, queue lengths, I/O traffic, and quality of service (QoS).

DETAILED DESCRIPTION

Figure 1:
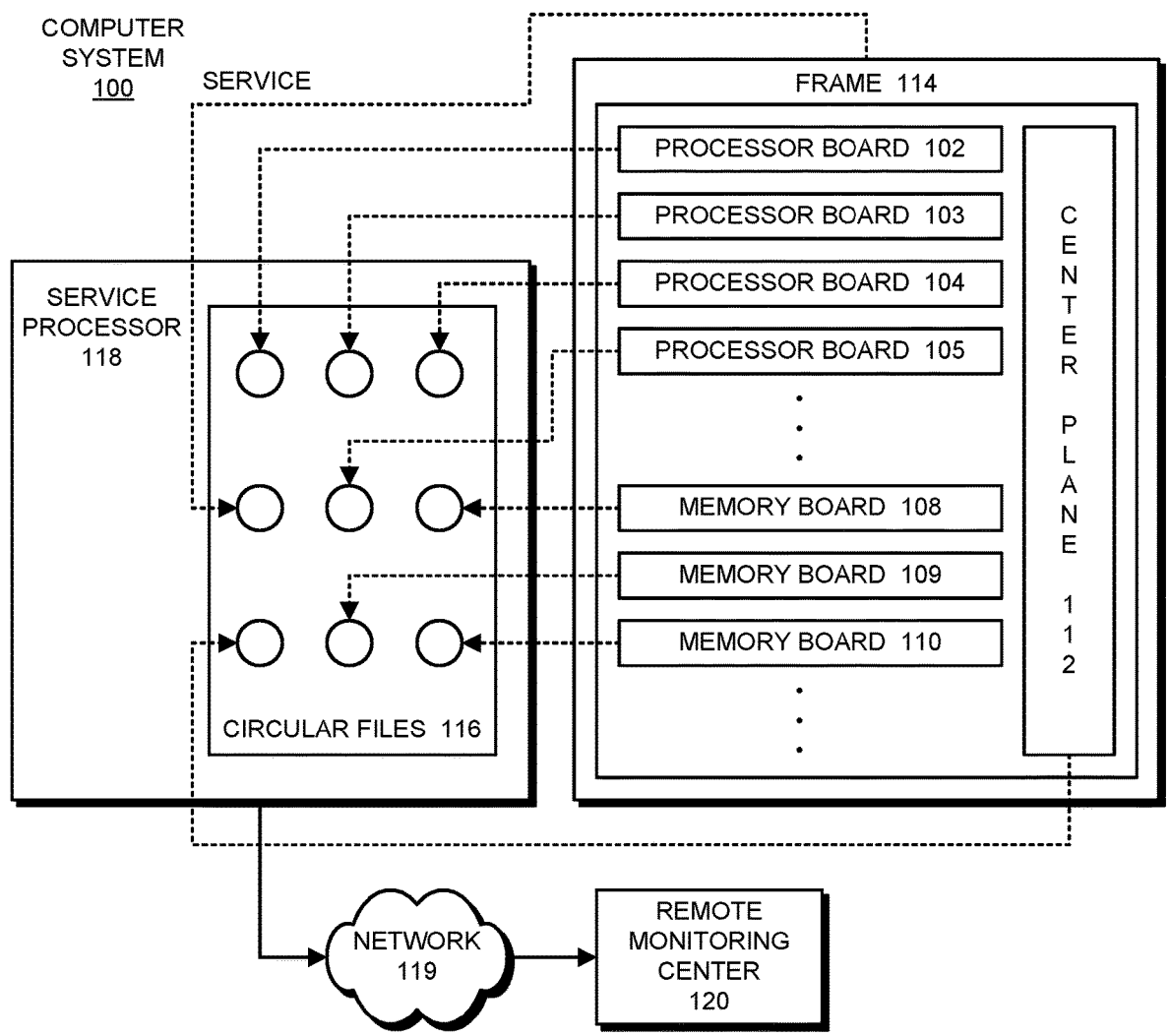
FIG. 1 illustrates a computer system that includes a service processor for processing telemetry signals in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The SPRT is an online statistical hypothesis test that differs from standard fixed-interval tests in the way in which statistical observations are employed. In familiar fixed-interval statistical tests, a given number of observations are used to select one hypothesis from one or more alternative hypotheses (e.g., deciding whether a monitored time series is normal or contains degraded or otherwise anomalous patterns). The SPRT, in contrast to fixed-interval tests, examines one observation at a time, and then makes a decision as soon as it has sufficient information to ensure that pre-specified confidence bounds are met. For given confidence bounds, the advantage we get from SPRT monitoring is that the SPRT has the shortest mathematically possible time-to-detection for anomalous patterns creeping into noisy process metrics.

The disclosed embodiments provide a novel technique for automated tuning, optimization, and validation of a SPRT (or other technique that is based on NLNP regression) for prognostic applications, such as prognostic cybersecurity applications, in which the FAP needs to be extremely low. The basic approach taken by the SPRT technique is to analyze successive observations of a discrete process. For example, let $y_n$ represent a sample from the process at a given moment $t_n$ in time. Also, assume for simplicity of illustration that the sequence of values $\{Y_n\} = y_0, y_1, \ldots, y_n$ comes from a stationary process characterized by a Gaussian, white-noise probability density function with mean 0. (Note that because we are dealing with nominally stationary processes, any process variables with a nonzero mean can be first normalized to a mean of zero with no loss of generality). The SPRT is a binary hypothesis test that analyzes observations about process behavior sequentially to determine whether or not the signal is consistent with normal behavior. When a SPRT reaches a decision about the current process behavior (i.e., that the signal is behaving normally or abnormally), the decision is reported and the test continues to process observations.

A significant challenge arises when tuning, optimizing, and validating SPRT-based prognostics (or other NLNP-regression-based prognostics) when extremely low FAPs are desired. Note that the original Wald SPRT assumed that the processes being monitored adhered to a purely Gaussian noise distribution. (See A. Wald. *Sequential Analysis*. John Wiley & Sons, New York, N.Y., 1947.) When that assumption is met, Wald proved that the empirical false alarm probability (FAP) and missed alarm probability (MAP) would always be less than the pre-specified false-alarm and missed-alarm probabilities, which are signified by alpha and beta in Wald's formalism. The problem is that it is very rare that real telemetry time series are idealized Gaussian time series. The biggest challenge that arises with real telemetry time series from electronic, industrial, and health-care telemetry is called "serial correlation." Humenik and Gross introduced a technique to "pre-whiten" time series signals by use of Fourier techniques to "learn" and filter serial correlation. (See [Humenik92] "Using Fourier Series Methods to Reduce Correlation of Nuclear Power Reactor Data," K. E. Humenik and K. C. Gross, *J. of Nuclear Science & Engineering* (112), 127-135, November 1992.) This technique has led to many prognostic implementations of SPRT over the past 25 years, wherein Fourier pre-whitening is applied until the remaining "whitened" signal is "close enough" to Gaussian (using statistical parameters such as the Kolmogorov-Smirnov, or KS statistic). At that point, one could use a Wald SPRT, but it is advisable to later validate the SPRT against real data to ensure that the Wald criteria were being met for empirical FAPs and MAPs.

A big advantage of SPRT-based (or other NLNP-regression-based) pattern-recognition techniques (as compared to conventional techniques based on threshold-limit tests) is that one can achieve high sensitivity for catching subtle anomalies with extremely low FAPs. However, as mentioned above, the length of time required to validate that the target FAPs are being met can be problematic.

The disclosed embodiments provide a new "self-tuning" and "self-optimizing" SPRT for prognostic applications, such as cybersecurity applications, where ultra-low FAPs are desired. Moreover, the disclosed embodiments provide a new technique for validating these ultra-low FAPs without having to collect many years of telemetry data.

Recall that SPRT is a real-time binary hypothesis test that continuously decides between a non-failure hypothesis H0, where the histogram of the time series is centered about a mean of zero, and a failure hypothesis H1, where the histogram of the time series is centered about a mean of M, where M is a predefined "anomaly disturbance magnitude." Many applications of SPRT normalize M to make it a unitless parameter. In the original Wald SPRT, M was in the same units as the process being monitored. However, as prognostics experts started expanding applications of the SPRT to thousands of types of time series signals, it became tedious for researchers implementing SPRTs to input desired M values in the same units as the corresponding variables (e.g., degrees C., volts, RPMs, amps, etc.). Instead, we now commonly define M to be the ratio of the "anomaly disturbance magnitude" to the standard deviation for the monitored time series. We typically use a value of 2 to 3 for M, which yields favorable results in terms of early detection of subtle anomalies in noisy process variables. Once an M is specified, two parameters can be configured by the user: (1) alpha (the desired FAP) and (2) beta (the desired MAP). Note that per Wald's proof, the empirical FAP and MAP will always be less than alpha and beta.

In the past, the training of the SPRT was straightforward. (See [Whisnant05] "Proactive Fault Monitoring in Enterprise Servers," K. Whisnant, K. C. Gross and N. Lingurovska, *Proc. 2005 IEEE Intn'l Multiconference in Computer Science & Computer Eng.*, Las Vegas, Nev., June 2005.) First, M, alpha, and beta are specified. Next, SPRT training data is collected for a period of time T, and this training data is divided into a training data set and a validation data set. For example, the first 80% of the observations in T could be used for training, and the remaining 20% of the observations could be used for validation. With this arrangement, the variance of the signal is computed and used in equation 2 of [Whisnant05]. Next, during the validation step, the empirical FAP is computed. If FAP<alpha, then the SPRT algorithm is considered to be trained and can be put into real-time surveillance mode. However, if FAP>alpha, the monitored time series did not meet Wald's criteria of being sufficiently close to Gaussian. At this point, the incoming signals are pre-whitened using a technique specified in [Whisnant05], or the system can alternatively use a different prognostic technique because a simple Wald SPRT cannot be used.

When alpha is reasonably large, e.g., a 1% FAP, and if the validation data has at least several hundred observations, then the above training process yields a trained SPRT that will have a high confidence of achieving the pre-specified alpha performance during operation. However, if we want to make alpha extremely small (e.g., $10^{-5}$), we need an extremely large amount of data for the validation process.

Note that if we have only a few hundred observations for the validation data, and we don't see a false alarm during those few hundred observations, it would be unwise to conclude that FAP<alpha. The large amount of data required for the validation process is problematic because we have to collect validation data for an impractical length of time to validate SPRT prognostics with ultra-low FAPs.

To overcome this problem, we employ a process introduced in [Humenik92] called "Fourier decomposition" in a new systematic recursive technique that allows optimization of the empirical FAP with respect to the dimensionless anomaly-degradation parameter M, and in an alternative embodiment allows the anomaly-degradation parameter M to be optimized with respect to the FAP. Note that we are not employing Fourier decomposition in the same manner as is described in [Humenik92], which uses the Fourier decomposition to pre-whiten time series signals to meet a target "whiteness" statistic, and then applies a SPRT. We are instead using Fourier decomposition in a new technique that "learns" the patterns of serial correlation in the monitored univariate time series, and then decomposes the signal under surveillance into its deterministic and stochastic components. For the deterministic, serially correlated components in the time series, an iterative Fourier decomposition technique is used, which decomposes the signal into an envelope of superimposed sine and cosine waves. This envelope of superimposed sine and cosine waves is referred to as the "Fourier composite."

We now add independent random noise to the Fourier composite so that the new synthesized signal has exactly the same variance as the original raw time series signal. For example, the independent random noise can be generated through a statistical model that generates Gaussian noise, Poisson noise or uniform-random noise. Note that we are able to add the random noise to the Fourier composite function because the Fourier composite function and the randomly generated noise function are independent and uncorrelated. Moreover, their variances are additive, so that the variance of the new synthesized signal is equal to the sum of the variance of the Fourier composite and the variance of the randomly generated noise function.

The new synthesized signal possesses the same statistical idiosyncrasies as the original univariate time series signal. It also possesses the same deterministic serial correlation, and matches the raw time series signal in the first and second statistical moments. Hence, we can use this new technique to generate a million hours of time series data that obey the same deterministic and stochastic structure as the original time series. We can then use this million hours of time series data to very precisely evaluate the asymptotic empirical FAP for the SPRT.

We now contrast a conventional technique for validating a SPRT-based (or other NLNP-regression-based) system with our new technique. A conventional technique for validating a SPRT-based system (or other NLNP-regression-based system) operates as follows:
 1. Set up SPRT with pre-specified FAP.
 2. Test the SPRT against real data and measure empirical FAP.
 3. If empirical FAP exceeds pre-specified FAP:
    a. Apply Fourier "pre-whitening" to data stream, and
    b. Go to step 2.
 4. When empirical FAP meets pre-specified FAP, the technique is done.

Note that for very low pre-specified FAPs, step 2 can never be achieved, because one cannot monitor a test system long enough (longer than five years) to evaluate ultra-low FAPs.

However, if we have an archive of signals from the previous five or more years that contains no faulted systems during that time, then we can validate a conventional SPRT by running those archived signals through the SPRT, iterating as many times as needed through steps 2-3, wherein each iteration removes an additional Fourier "mode" or harmonic, making the signals successively more "white" with each iteration.

In contrast, the new validation process for SPRT-based systems operates as follows.
1. Set up SPRT with pre-specified FAP.
2. Monitor the system for a minimum of 3-4 weeks, or equivalently, read data from a historical archive containing at least 3-4 weeks of actual monitored data.
3. Decompose each raw signal in the monitored data into its deterministic and stochastic components using a Fourier decomposition technique.
4. Reconstruct a new, synthesized signal that has exactly the same serial-correlation structure and stochastic structure as the original raw monitored signal.
5. Use the new synthesized signal formulation to generate 1 million hours of data that are statistically indistinguishable from the original raw monitored signals.
6. Use the 1 million hours of synthesized data to evaluate whether the empirical SPRT FAP meets the pre-specified FAP using the same validation as a conventional SPRT, but with sufficient data to achieve the pre-specified FAP.

Note that this new validation process can be applied to systems that have not had 5+ years of continuous operation to generate a database of historical data that can be used to tune and validate a SPRT-based prognostic system. This new validation process allows SPRT-based prognostics to be tuned, optimized, and fully validated using data from only 3-4 weeks of telemetry monitoring and collection.

We next describe details of an exemplary electronics-prognostics system that makes use of this new validation process.

Computer System

FIG. 1 illustrates an exemplary prognostics system that can obtain telemetry data from: an operating system of the computer system, a set of sensors in the computer system, and/or one or more external sensors that reside outside the computer system. As shown in FIG. 1, a computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, and/or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. (Note that the software monitors that generate telemetry signals are also referred to as "software sensors" or simply sensors within this specification and the appended claims.) In one or more embodiments, a dedicated circular file is created and used for each FRU within computer system 100. Alternatively, a single comprehensive circular file may be created and used to aggregate performance data for all FRUs within computer system 100.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computer system 100, as described below with respect to FIG. 2. The system of FIG. 1 is described further in U.S. Pat. No. 7,020,802 (issued Mar. 28, 2006), by inventors Kenny C. Gross and Larry G. Votta, Jr., entitled "Method and Apparatus for Monitoring and Recording Computer System Performance Parameters," which is incorporated herein by reference.

Figure 2:
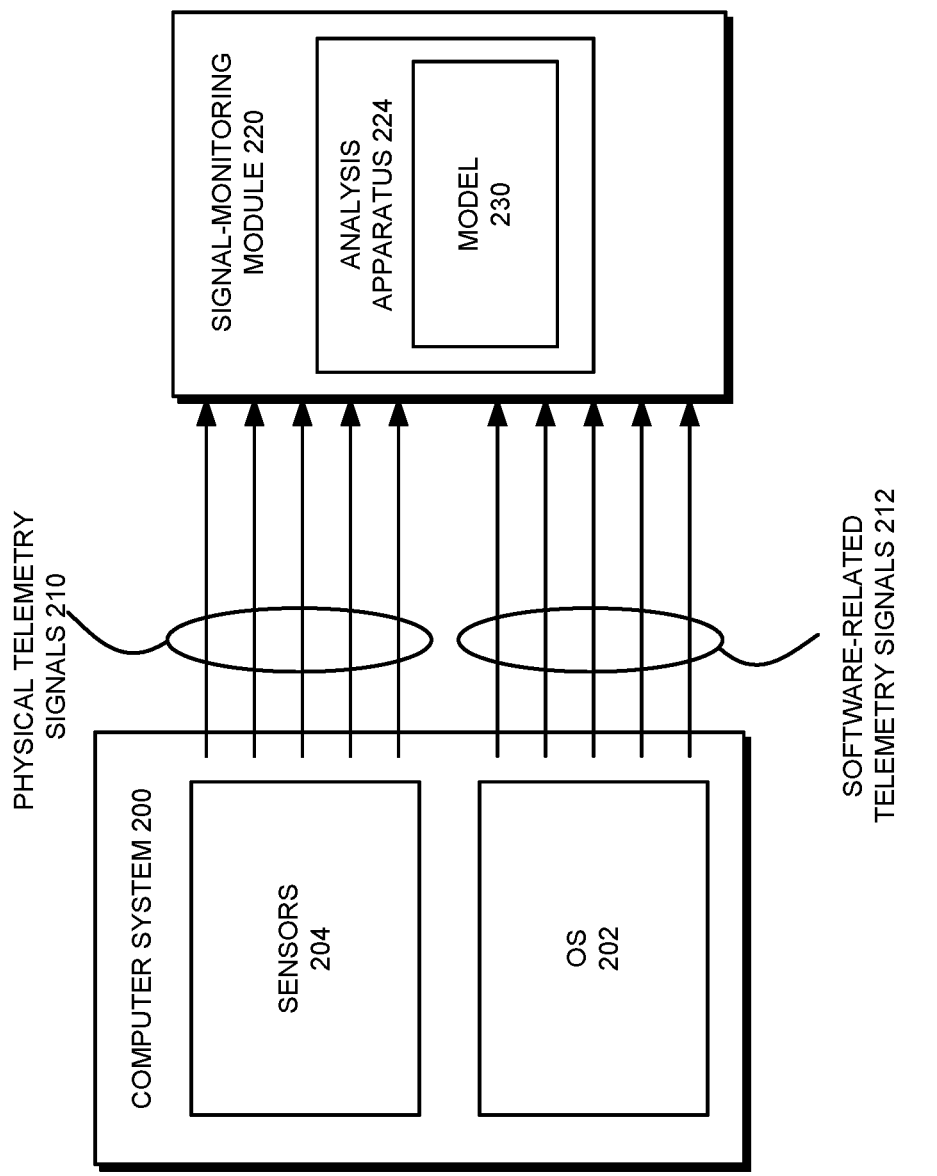
FIG. 2 illustrates a telemetry-analysis system in accordance with the disclosed embodiments.

FIG. 2 shows a telemetry-analysis system that performs prognostic pattern-recognition operations in accordance with an embodiment. In this example, a computer system 200 is monitored using a number of telemetric signals, including physical telemetry signals 210 and software-related telemetry signals 212, which are transmitted to a signal-monitoring module 220. Signal-monitoring module 220 may assess the state of computer system 200 using these telemetry signals 210 and 212. For example, signal-monitoring module 220 may analyze telemetry signals 210 and 212 to detect and manage faults in computer system 200 and/or issue alerts when there is an anomaly, a malicious intrusion event or a degradation risk in computer system 200.

Signal-monitoring module 220 may be provided by and/or implemented using a service processor associated with computer system 200. Alternatively, signal-monitoring module 220 may reside within a remote monitoring center (e.g., remote monitoring center 120 of FIG. 1) that obtains telemetry signals 210 and 212 from computer system 200 over a network connection. Moreover, signal-monitoring module 220 may include functionality to analyze both real-time telemetry signals 210 and 212 and long-term historical telemetry data. For example, signal-monitoring module 220 may be used to detect anomalies in telemetry signals 210 and 212 received directly from the monitored computer system(s). Signal-monitoring module 220 may also be used during offline detection of anomalies from the monitored computer system(s) by processing archived and/or compressed telemetry data associated with the monitored computer system(s).

Prior to analyzing telemetry signals 210 and 212, analysis apparatus 224 may aggregate and pre-process telemetry signals 210 and 212. Moreover, during pre-processing of telemetry signals 210 and 212, analysis apparatus 224 may synchronize disparate sampling streams by standardizing timestamps of telemetry signals 210 and 212 from different domains. Next, analysis apparatus 224 may transform telemetry signals 210 and 212 into signals with uniform sampling rates. For example, analysis apparatus 224 may use an analytical re-sampling process (ARP) to up-sample signals with slower sampling rates to match the highest sampling rates in the aggregation of monitored telemetry signals 210 and 212.

In one or more embodiments, the nonlinear, nonparametric regression technique used by analysis apparatus 224 corresponds to a Multivariate State Estimation Technique (MSET). Analysis apparatus 224 may be trained using historical telemetry data from computer system 200 and/or similar computer systems. The historical telemetry data may be used to determine correlations among various telemetry signals 210 and 212 collected from the monitored computer system, wherein the correlations are embodied in a model 230 that can be used to detect incipient anomalies that arise during operation of computer system 200. Note that model 230 can generally include any type of model that can be trained using a nonlinear, nonparametric (NLNP) regression technique. In some embodiments, model 230 is implemented using an MSET model.

Those skilled in the art will appreciate that the nonlinear, nonparametric regression technique used in analysis apparatus 224 may be provided by any number of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines several different pattern-recognition approaches. Hence, the term "MSET" as used in this specification can refer to (among other things) any of the 25 techniques outlined in Gribok, including Ordinary Least Squares (OLS), Support Vector Machines (SVM), Artificial Neural Networks (ANNs), MSET, or Regularized MSET (RMSET).

Prognostic-Surveillance Mechanism

Figure 3:
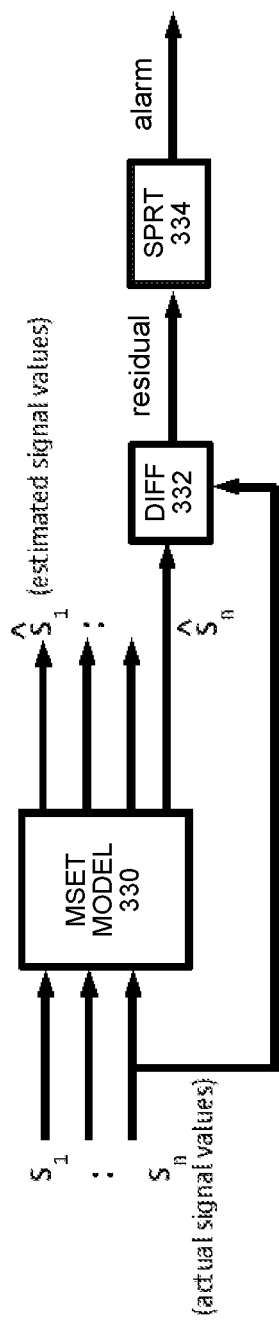
FIG. 3 illustrates a prognostic-surveillance mechanism in accordance with the disclosed embodiments.

FIG. 3 illustrates how a prognostic-surveillance mechanism that uses an MSET model (or another NLNP-regression-based model) operates in accordance with the disclosed embodiments. Referring to FIG. 3, for specific systems, processes, or assets under surveillance, there exist a collection of n time series sensor signals, $S_1, S_2, \ldots, S_n$, that are being monitored. These time series signals feed into an MSET pattern-recognition model 330. Although MSET is used in the disclosed embodiments, the disclosed embodiments can generally use any one of a generic class of pattern-recognition techniques called nonlinear, nonparametric (NLNP) regression, which includes MSET, neural networks, auto-associative kernel regression (AAKR), and even simple linear regression (LR).

In the scheme illustrated in FIG. 3, the MSET model 330 is "trained" to learn patterns of correlation among all of the monitored time series signals $S_1, S_2, \ldots, S_n$. This training process involves a computationally intensive calculation involving data that contains no anomalies. The pattern-recognition system is then placed into a "real-time surveillance mode," wherein the trained MSET model 330 predicts what each signal should be, based on other correlated variables; these are the "estimated signal values" illustrated in FIG. 3. Prognostic fault detection is achieved by using a differencing module 332 to perform a pairwise differencing operation between the actual signal values and the estimated signal values. The system then applies a "detection operation" to the residuals generated by the differencing operation by using a sequential probability ratio test (SPRT) module 334 to detect anomalies and possibly generate an alarm.

Validation Process

Figure 4:
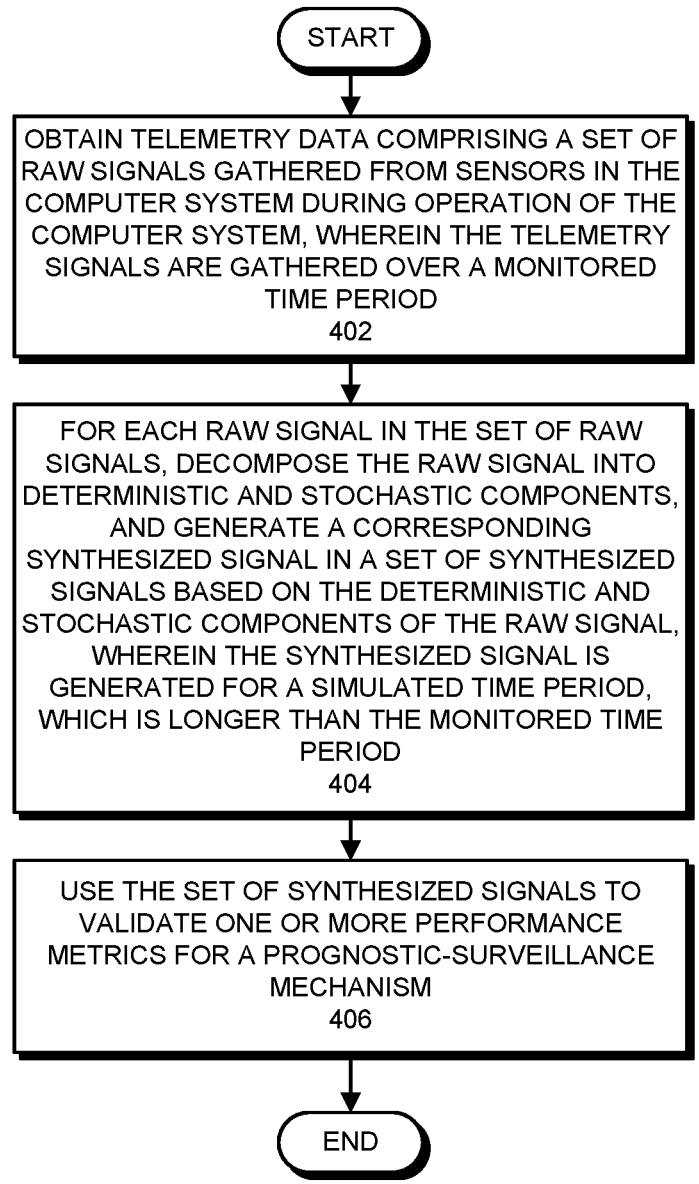
FIG. 4 presents a flowchart illustrating the process of validating a prognostic-monitoring mechanism in accordance with the disclosed embodiments.

FIG. 4 presents a flowchart illustrating the process of validating a prognostic-monitoring mechanism in accordance with the disclosed embodiments. During operation, the system obtains telemetry data comprising a set of raw signals gathered from sensors in the computer system during operation of the computer system, wherein the telemetry signals are gathered over a monitored time period (step 402). Next, for each raw signal in the set of raw signals, the system decomposes the raw signal into deterministic and stochastic components. The system also generates a corresponding synthesized signal in a set of synthesized signals based on the deterministic and stochastic components of the raw signal, wherein the synthesized signal is generated for a simulated time period, which is longer than the monitored time period (step 404). Finally, the system uses the set of synthesized signals to validate one or more performance metrics of the prognostic-surveillance mechanism (step 406). (Note that after the prognostic surveillance mechanism is validated, it can subsequently be used to monitor the computer system to generate an alert/alarm when malicious intrusion events or impending failures are detected.)

Figure 5:
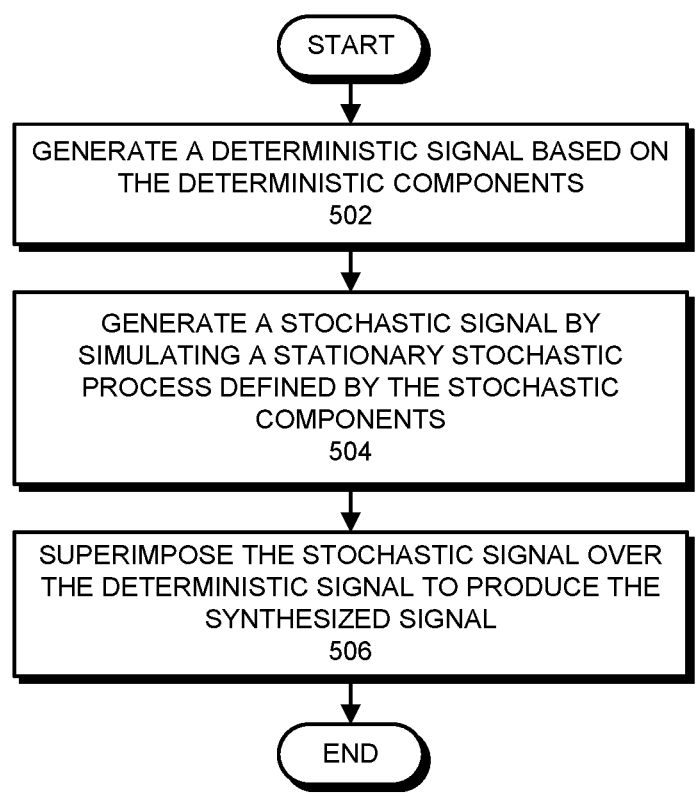
FIG. 5 presents a flowchart illustrating the process of generating a synthesized signal from the deterministic and stochastic components of a raw signal in accordance with the disclosed embodiments.

FIG. 5 presents a flowchart illustrating the process of generating a synthesized signal from deterministic and stochastic components of a raw signal in accordance with the disclosed embodiments. (Note that this process takes place in step 404 during the validation process described above.) During this process, the system generates a deterministic signal based on the deterministic components (step 502). The system also generates a stochastic signal by simulating a stationary stochastic process defined by the stochastic components (step 504). Finally, the system superimposes the stochastic signal over the deterministic signal to produce the synthesized signal (step 506).

Figure 6:
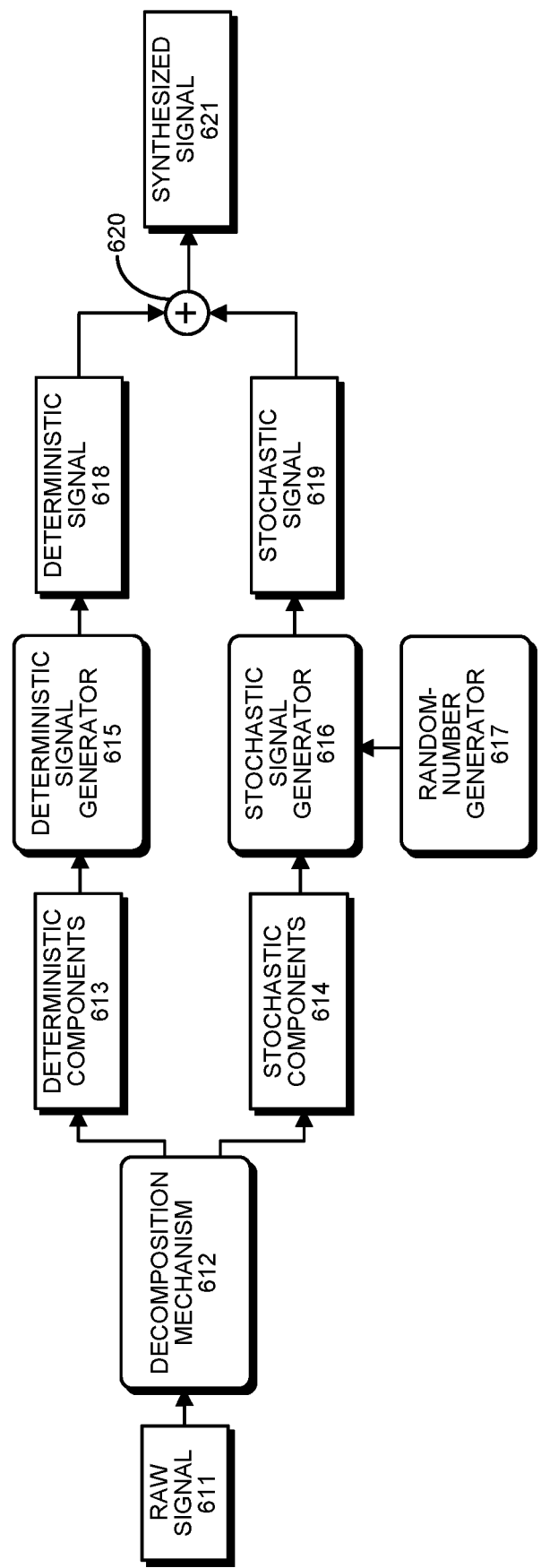
FIG. 6 presents a block diagram illustrating the process of constructing a synthesized signal from a raw signal in accordance with the disclosed embodiments.

FIG. 6 presents a block diagram illustrating the process of constructing a synthesized signal 621 from a raw signal 611 in accordance with the disclosed embodiments. The system first uses a decomposition mechanism 612 to decompose raw signal 611 into deterministic components 613, which comprise an envelope of superimposed sine waves and cosine waves, and stochastic components 614, which define a stationary stochastic process. As mentioned above, this decomposition process can involve the use of a Fourier decomposition technique. Next, the system uses a deterministic signal generator 615 to generate a deterministic signal 618 from the deterministic components 613. Similarly, the system uses a stochastic signal generator 616, which makes use of a random number generator 617, to generate a stochastic signal 619 by simulating the stationary stochastic process defined by stochastic components 614. Finally, the system overlays stochastic signal 619 on deterministic signal 618 by using an adder 620 to generate a synthesized signal 621 corresponding to raw signal 611.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for validating a prognostic-surveillance mechanism for detecting anomalies that arise during operation of a computer system using synthesized signals, comprising:
   obtaining, by a monitoring mechanism of a service processor, telemetry data comprising a set of raw signals gathered from sensors in the computer system during operation of the computer system, wherein the telemetry signals are gathered over a monitored time period;
   for each raw signal in the set of raw signals,
      decomposing the raw signal into deterministic and stochastic components, and
      generating a corresponding synthesized signal in a set of synthesized signals based on the deterministic and stochastic components of the raw signal, wherein the synthesized signal is generated for a simulated time period, which is longer than the monitored time period by at least two orders of magnitude; and
   using the set of synthesized signals to validate one or more performance metrics of the prognostic-surveillance mechanism.

2. The method of claim 1, wherein validating the one or more performance metrics of the prognostic-surveillance mechanism comprises validating whether the prognostic-surveillance mechanism generates an alarm associated with one or more of the following:
   a malicious intrusion event; and
   an impending failure.

3. The method of claim 1, wherein validating the one or more performance metrics of the prognostic-surveillance mechanism comprises validating that the prognostic-surveillance mechanism meets one or more of the following:
   a desired false alarm probability (FAP); and
   a desired missed alarm probability (MAP).

4. The method of claim 1, wherein each synthesized signal in the set of synthesized signals has the same serial-correlation structure and the same stochastic structure as a corresponding raw signal in the set of raw signals.

5. The method of claim 1, wherein decomposing the raw signal comprises using an iterative Fourier decomposition technique to decompose the raw signal into deterministic components that comprise an envelope of superimposed sine waves and cosine waves.

6. The method of claim 5, wherein decomposing the raw signal further comprises subtracting the deterministic components from the raw signal to generate a residual signal that comprises the stochastic components of the raw signal, wherein the stochastic components define a stationary stochastic process.

7. The method of claim 1, wherein generating the synthesized signal based on the deterministic and stochastic components comprises:
   generating a deterministic signal based on the deterministic components;
   generating a stochastic signal by simulating a stationary stochastic process defined by the stochastic components; and
   superimposing the stochastic signal over the deterministic signal to produce the synthesized signal.

8. The method of claim 1, wherein a stationary stochastic process that defines the stochastic components comprises one or more of the following:
   a Gaussian process;
   a Poisson process; and
   a uniform random process.

9. The method of claim 1, wherein a stationary stochastic process that defines the stochastic components generates a probability distribution defined by one or more of the following parameters:
   a mean;
   a variance;
   a skewness; and
   a kurtosis.

10. The method of claim 1, wherein the prognostic-surveillance mechanism uses one or more models that are trained using a nonlinear, nonparametric (NLNP) regression technique to predict signal values.

11. The method of claim 1, wherein the set of raw signals includes:
   signals gathered from physical sensors in the computer system that monitor physical performance parameters, including one or more of temperature, voltage, current, vibration, and acoustic parameters; and
   signals that carry software-related telemetry parameters, including one or more of processor load, memory usage, cache usage, system throughput, queue lengths, I/O traffic, and quality of service (QoS).

12. A non-transitory computer-readable storage medium storing instructions that when executed by a computer cause the computer to perform a method for validating a prognostic-surveillance mechanism for detecting anomalies that arise during operation of a computer system using synthesized signals, the method comprising:
   obtaining telemetry data comprising a set of raw signals gathered from sensors in the computer system during operation of the computer system, wherein the telemetry signals are gathered over a monitored time period;
   for each raw signal in the set of raw signals,
      decomposing the raw signal into deterministic and stochastic components, and
      generating a corresponding synthesized signal in a set of synthesized signals based on the deterministic and stochastic components of the raw signal, wherein the synthesized signal is generated for a simulated time period, which is longer than the monitored time period by at least two orders of magnitude; and
   using the set of synthesized signals to validate one or more performance metrics of the prognostic-surveillance mechanism.

13. The non-transitory computer-readable storage medium of claim 12, wherein validating the one or more performance metrics of the prognostic-surveillance mechanism comprises validating whether the prognostic-surveillance mechanism generates an alarm associated with one or more of the following:
   a malicious intrusion event; and
   an impending failure.

14. The non-transitory computer-readable storage medium of claim 12, wherein validating the one or more performance metrics of the prognostic-surveillance mechanism comprises validating that the prognostic-surveillance mechanism meets one or more of the following:
a desired false alarm probability (FAP); and
a desired missed alarm probability (MAP).

15. The non-transitory computer-readable storage medium of claim 12, wherein each synthesized signal in the set of synthesized signals has the same serial-correlation structure and the same stochastic structure as a corresponding raw signal in the set of raw signals.

16. The non-transitory computer-readable storage medium of claim 12, wherein decomposing the raw signal comprises using an iterative Fourier decomposition technique to decompose the raw signal into deterministic components that comprise an envelope of superimposed sine waves and cosine waves.

17. The non-transitory computer-readable storage medium of claim 16, wherein decomposing the raw signal further comprises subtracting the deterministic components from the raw signal to generate a residual signal that comprises the stochastic components of the raw signal, wherein the stochastic components define a stationary stochastic process.

18. The non-transitory computer-readable storage medium of claim 12, wherein generating the synthesized signal based on the deterministic and stochastic components comprises:
generating a deterministic signal based on the deterministic components;
generating a stochastic signal by simulating a stationary stochastic process defined by the stochastic components; and
superimposing the stochastic signal over the deterministic signal to produce the synthesized signal.

19. The non-transitory computer-readable storage medium of claim 12, wherein the prognostic-surveillance mechanism uses one or more models that are trained using a nonlinear, nonparametric (NLNP) regression technique to predict signal values.

20. A system that validates a prognostic-surveillance mechanism for detecting anomalies that arise during operation of a computer system using synthesized signals, comprising:
a service processor, comprising a monitoring mechanism and a validation mechanism that,
obtains telemetry data comprising a set of raw signals gathered from sensors in the computer system during operation of the computer system, wherein the telemetry signals are gathered over a monitored time period;
for each raw signal in the set of raw signals,
decomposes the raw signal into deterministic and stochastic components, and
generates a corresponding synthesized signal in the set of synthesized signals based on the deterministic and stochastic components of the raw signal wherein the synthesized signal is generated for a simulated time period, which is longer than the monitored time period by at least two orders of magnitude; and
uses the set of synthesized signals to validate one or more performance metrics of the prognostic-surveillance mechanism.

* * * * *